United States Patent Office 3,448,930
Patented June 10, 1969

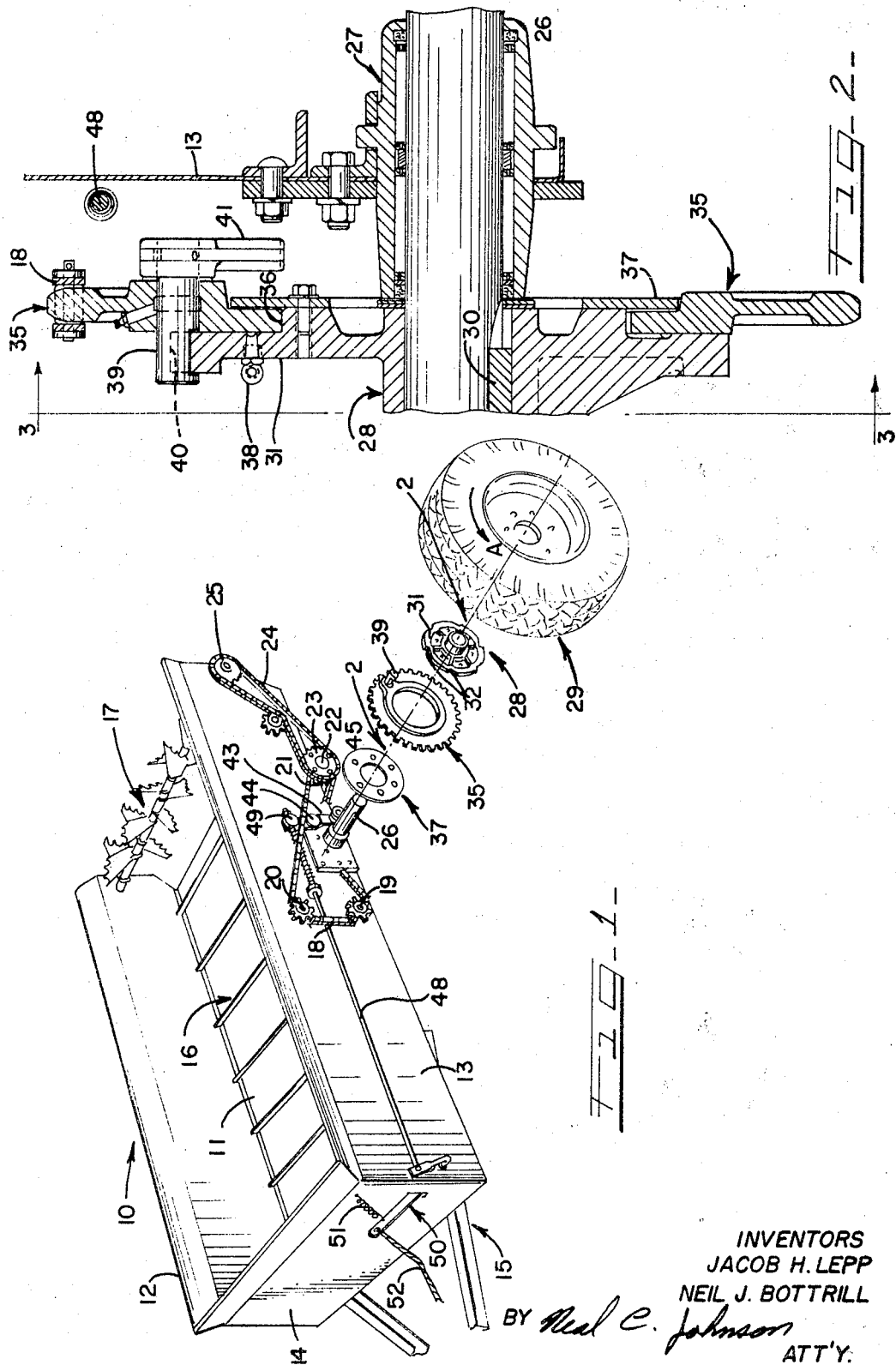

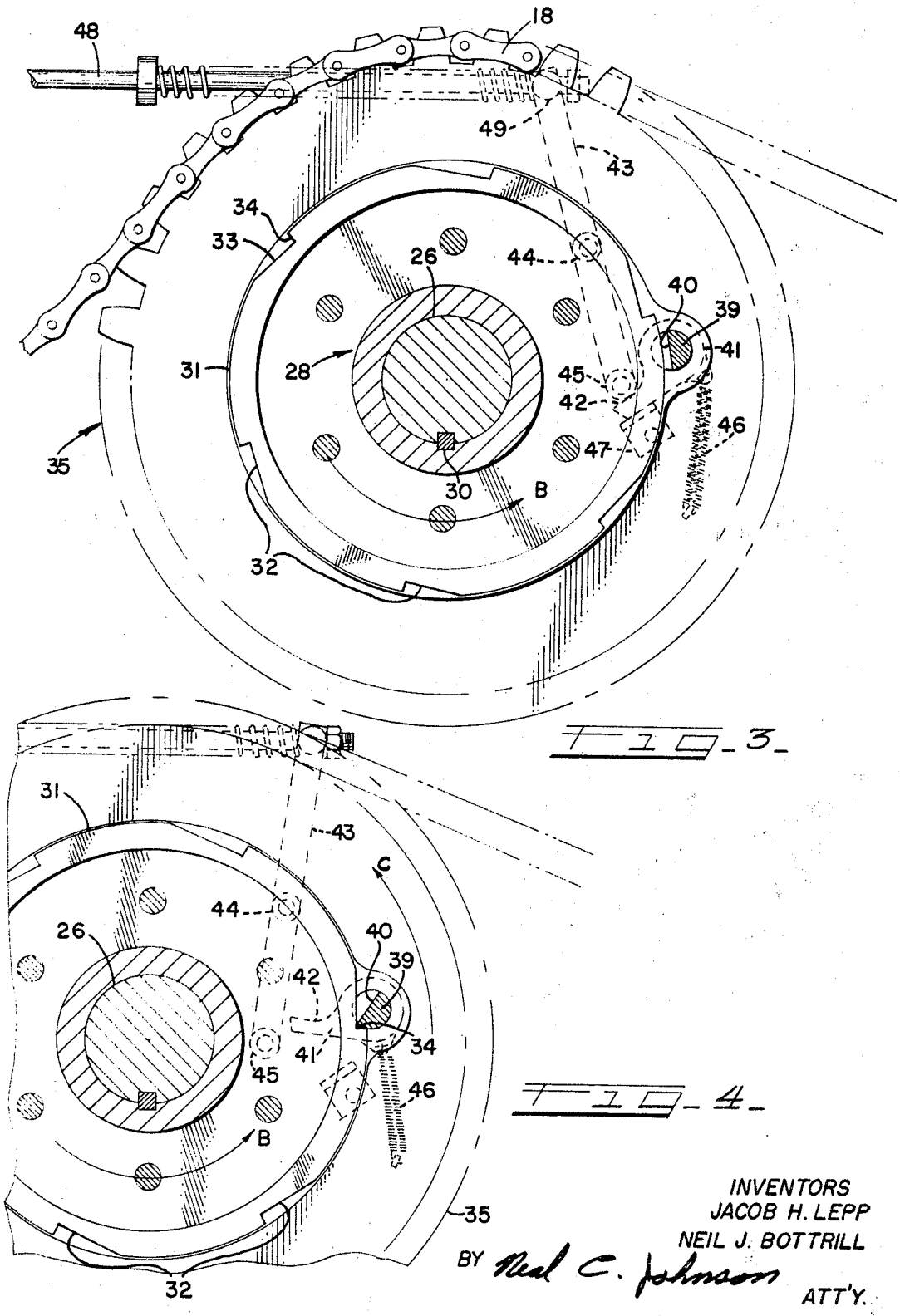

3,448,930
SPREADER DRIVE MECHANISM
Jacob H. Lepp, Grimsby, Ontario, and Neil J. Bottrill, Hamilton, Ontario, Canada, assignors to International Harvester Company, Chicago, Ill., a corporation of Delaware
Filed Sept. 27, 1967, Ser. No. 670,888
Int. Cl. A01c 17/00
U.S. Cl. 239—685     10 Claims

ABSTRACT OF THE DISCLOSURE

A manure spreader having a body and an axle mounting wheels for supporting the body. The spreader includes an unloading mechanism for the spreader body. The unloading mechanism is selectively driveable in response to rotation of a ground wheel by means including a clutch mechanism mounted about the axle. The clutch mechanism is selectively operable by a control linkage assembly mounted on the spreader body and accessible to an operator riding a tractor pulling the spreader.

BACKGROUND OF THE INVENTION (1) *Field of the invention.*—The invention relates generally to ground wheel driven manure spreaders and more particularly to an improved mechanism for selectively driving the unloading mechanism of the spreader.

(2) *Description of the prior art.*—Conventional manure spreaders of the type adapted to be pulled by the ordinary tractor, include unloading mechanisms powered either by the PTO of the tractor or by one of the wheels of the spreader. The ground wheel driven spreader is customarily designed for smaller scale farming operations and hence must be low in cost and economical to operate and service.

Conventional spreaders are normally equipped with a so-called shiftable chain assembly wherein a drive chain of the unloading mechanism is shiftable into and out of engagement with a drive sprocket coupled to a wheel of the spreader. These assemblies are typically cumbersome to install and operate and have high initial and maintenance costs. Moreover, difficulties have been experienced in maintaining the necessary coplanar relationship of the chain and sprocket as the chain is lowered and raised into and out of engagement with the sprocket. The resulting misalignment prevents proper engagement of the chain on the sprocket teeth.

An additional problem with shiftable chain assemblies involves the manner of disengagement of the chain from the sprocket. The chain normally engages a substantial portion of the periphery of the sprocket so that the driving stress will be distributed between a substantial number of teeth and cross members of the chain. As the chain is lifted from the sprocket, a progressively decreasing number of teeth will be engaged by the chain, with the result that all of the stress must be absorbed by a very few teeth just prior to complete disengagement. This results in uneven wear breakage of the teeth and consequent frequent repair.

Attempts to utilize systems in place of shiftable chain assemblies have been unsatisfactory from the point of view of initial and maintenance costs. An example of such a system is disclosed in U.S. Patent No. 947,588 issued to Brown, wherein a relatively complex planetary gear unit is used for selectively driving the beater from a ground drive wheel on the spreader.

SUMMARY

The invention relates to a simple and effective drive mechanism for the unloading mechanism of a ground wheel drive manure spreader wherein the drive mechanism is selectively operable to drive the unloading mechanism in response to rotation of a ground wheel of the spreader. The drive mechanism includes hub means for mounting the ground drive wheel on an axle of the spreader and includes an annular peripheral portion having a plurality of circumferentially spaced notches defined therein. A sprocket gear is rotatably mounted on the hub means and is in continuous engagement with the unloading mechanism of the spreader.

The invention further includes means selectively movable for coupling the gear and hub means for conjoint rotation to drive the unloading mechanism. The means includes a pin journaled in the gear and having a recess defined therein radially overlying the peripheral portion of the hub means.

Lever means are cooperatively arranged on the spreader body and on the pin for selectively rotating the pin between a disengaged position wherein the peripheral portion clears the recess and engage position wherein the pin engages one of the notches. Accordingly, the unloading mechanism is selectively operable in response to actuation of the lever means.

The drive mechanism of the invention solves the problems of the prior art by eliminating the use of shiftable chain assemblies. Moreover the drive mechanism is simple and rugged in design so as to be economically feasible in ground wheel driven spreaders.

BRIEF DESCRIPTION OF THE DRAWINGS

FIGURE 1 is a fragmentary perspective view of a manure spreader illustrating elements of the drive mechanism in exploded view;

FIGURE 2 is a fragmentary sectional view taken generally in the direction of arrows 2—2 of FIGURE 1 illustrating the elements in assembled relation;

FIGURE 3 is a fragmentary sectional view taken generally in the direction of arrows 3—3 of FIGURE 2 illustrating the drive mechanism in a disengaged or nondriving position; and FIGURE 4 is a fragmentary sectional view similar to FIGURE 3 illustrating the drive mechanism in an engaged or driving position.

DESCRIPTION OF THE PREFERRED EMBODIMENT

Referring first to FIGURE 1 there is shown a manure spreader having a body 10 including a bottom wall 11, side walls 12 and 13, and a front wall 14. A suitable frame assembly 15 is secured to the forward portion of the body 10 for mounting a hitch assembly (not shown) by which the spreader may be pulled by an ordinary farm tractor. The spreader includes an apron conveyor 16 for moving a load rearwardly toward a beater 17 journaled between the side walls 12 and 13 at the rearward end of the spreader.

The conveyor 16 and beater 17 are adapted to be driven through means including a drive chain 18 mounted on idler sprockets 19 and 20 journaled on the side wall 13 and on a sprocket 21 mounted on a shaft 22. The shaft 22 extends transversely of the spreader beneath the bottom wall 11 for driving a suitable mechanism (not shown) operable to intermittently drive the apron conveyor 16 in the known manner. A sprocket 23 is mounted on the shaft 22 outboard of the sprocket 21 and serves to transmit drive to the beater 17 through a chain 24 mounted between the sprocket 23 and a beater shaft sprocket 25 as shown.

The spreader includes an axle 26 extending transversely of the spreader body for receiving a wheel at each side thereof. The axle 26 may be rotatably journaled in suitable bearing assemblies, one of which being shown at 27 in FIGURE 2.

A hub 28 is adapted to be mounted on the axle 26 for mounting a ground drive wheel 29 thereon. As best shown in FIGURE 2 the hub 28 is coupled to the axle 26 by means including a key 30 providing conjoint rotation of the hub, axle, and wheel. While not shown in detail it will be understood that the connection between the hub and the wheel is such that the hub rotates together with the wheel only when the wheel is rotated in the direction of arrow A in FIGURE 1 as the spreader is pulled forwardly.

The hub 28 includes an annular radially disposed flange portion 31 axially spaced from the wheel 29. A plurality of circumferentially spaced notches 32 are defined in the periphery of the annular portion 31 for purposes to be described. As shown in FIGURE 3 each of the notches 32 is defined by a flat guide surface 33 joining a generally radially extending shoulder 34.

A sprocket gear 35 is mounted on the annular portion 31 of the hub so as to be relatively rotatable with respect to the hub. As best shown in FIGURE 2 the gear 35 has an outer diameter greater than and an inner diameter less than the diameter of the annular portion 31 of the hub. The portion 31 of the hub includes an annular boss or rib 36 formed on a side thereof facing the side wall 13 of the spreader. The gear 35 is positioned around the rib 36 and an annular plate 37 is bolted to the rib as shown. Accordingly, the gear 35 is retained on the hub in an annular channel defined by the plate 37, rib 36, and the side of the annular portion 31 opposing the plate 37. As above mentioned the hub and gear are relatively rotatable and a lubricant fitting 38 may be mounted on the hub as shown to permit the introduction of suitable lubricant between the relatively movable surfaces of the gear and hub.

As shown with reference to FIGURES 2 and 3, the lower run of the drive chain 18 is engaged on the sprocket gear 35 so that rotation of the gear 35 drives the above described unloading mechanism.

The drive mechanism of the invention includes means selectively movable for coupling the hub 28 and gear 35 for conjoint rotation to drive the unloading mechanism when desired. Toward that result a generally cylindrical pin 39 is journaled through the gear 35 parallel to the axis of rotation of the axle, hub, and gear. The pin 39 is disposed to radially overlie the periphery of the annular portion 31 of the hub. The pin 39 includes a groove or recess 40 defined transversely or chordally thereof and having an axial extent slightly greater than the width or thickness of the peripheral portion of the annular portion 31.

The drive mechanism of the invention includes lever means cooperatively arranged on the spreader body and on the pin 39 for selectively rotating the pin between positions engaging and disengaging from the hub 28 to selectively drive the unloading mechanism. Toward that result a cam lever 41 is secured on the pin 39 on an end thereof proximate to the side wall 13. As best shown in FIGURES 3 and 4, the cam lever 41 includes a camming surface 42 extending generally radially from the pin 39 and facing in the direction of rotation of the gear 35 for purposes to be described.

The lever means further includes a control lever 43 pivotally mounted on the spreader side wall 13 on a pivot pin 44 mounted on the side wall rearwardly and somewhat above the axle 26. A roller 45 is mounted on the lower portion of the control lever 43 and extends outwardly therefrom for rotation about an axis parallel to the axis of rotation of the axle 26. The control lever 43 is pivotable about the pin 44 so as to position the roller 45 into and out of engagement with the cam surface 42 of the cam lever 41.

It will be noted in FIGURES 3 and 4 that a spring 46 is mounted on the gear 35 and is connected to the cam lever 41 so as to normally bias the lever 41 and pin 39 into the position illustrated in FIGURE 4. In addition, a stop member 47 is mounted on the gear 35 for limiting movement of the cam lever 41 when engaged by the roller 45 as shown in FIGURE 3, all for purposes to be described with reference to the operation of the invention.

The above described structural arrangement of the drive mechanism of the invention is operable through a suitable linkage assembly mounted on the spreader and accessible to an operator riding a tractor pulling the spreader. A rod 48 is pivotally coupled to the upper end of the control lever 43 by a suitable trunnion assembly 49. The rod 48 extends forwardly along the side wall 13 where it is coupled to a suitable arm assembly 50 pivotally mounted on the forward portion of the spreader body. A spring 51 may be connected between the arm assembly 50 and the spreader body as shown. A rope 52 is connected to the arm assembly 50 and is accessible to the operator on the pulling tractor.

OPERATION

As the spreader is pulled forwardly the ground drive wheel 29 rotates in the direction of arrow A (FIGURE 1) thus driving the hub 28 in the same direction as indicated by arrow B in FIGURES 3 and 4. With the control lever 43 disposed in the position shown in FIGURE 3, it will be seen that the roller 45 engages the camming surface 42 of the cam lever 41. Accordingly the cam lever 41 is held against the stop member 47 and the pin 39 is held in a position wherein the periphery of the annular portion 31 is rotatable through recess 40 as shown. Consequently the gear 35 is not rotatably driven and the unloading mechanism of the spreader will be inoperative.

When it is desired to drive the unloading mechanism, the operator permits the arm assembly 50 to pivot rearwardly under the force of spring 51 thereby moving the rod 48 rearwardly. This permits the control lever 43 to pivot to the position shown in FIGURE 4. As the roller 45 rolls off the camming surface 42 the cam lever 41 and pin 39 will move to the position of FIGURE 4 in response to the force of the spring 46. Accordingly the pin 39 is positioned to be engaged by the shoulder 34 of the notch 32 as the hub 28 continues its rotation in the direction of arrow B. The gear 35 is thus driven with the hub in the direction of arrow C to drive the chain 18 and thus the unloading mechanism.

The disengagement of the drive to the unloading mechanism is accomplished by actuating the arm assembly 50 to move the control lever 43 to the position shown in FIGURE 3. It will be seen that the roller 45 thus moved radially outwardly with respect to the axle 26 so as to be disposed in the path of rotation of the cam lever 41. As the cam lever 41 rotates with the hub and gear, the camming surface 42 will engage the roller 45 whereupon the lever 41 and pin 39 will be rotated to the position shown in FIGURE 3. Accordingly the periphery of the pin 39 will be moved out of engagement with shoulder 34 permitting the hub to continue rotating in the direction of arrow B due to the clearance between the recess 40 and the periphery of the annular portion 31 of the hub. The driving connection between the hub 28 and gear 35 is thus disconnected.

In practice it has been found that the foregoing arrangement not only eliminates the problems associated with shiftable chain assemblies, but moreover provides a simple, rugged, and relatively inexpensive system as compared with planetary gear units previously suggested in the art.

Various changes falling within the scope and spirit of the invention may occur to those skilled in the art. The invention is therefore not to be thought of as limited to the specific embodiment set forth.

What is claimed is:
1. In a manure spreader having a body and a transverse axle on the body, wheels mounted on the axle for mobilely supporting the spreader body, an unloading mechanism for unloading the contents of the spreader body, and means for selectively driving the unloading mechanism, wherein the improvement comprises: hub means mounting a ground drive wheel on the axle and further including an annular peripheral portion having a plurality of circumferentially spaced notches defined therein; a sprocket gear continuously engaged with the unloading mechanism and rotatably mounted on said hub means; means selectively movable for coupling said gear and hub means for conjoint rotation to drive the unloading mechanism, said means including a pin journaled in said gear and having a recess defined therein radially overlying said peripheral portion of said hub means; and lever means cooperatively arranged on the spreader body and on said pin for selectively rotating said pin between a disengaged position wherein said peripheral portion clears said recess and an engaged position wherein said pin peripherally engages one of said notches, whereby the unloading mechanism is selectively operable in response to actuation of said lever means.

2. The subject matter of claim 1, wherein said lever means includes a cam lever mounted on said pin proximate to the spreader body, and further including a control lever pivotally mounted on the spreader body proximate to said gear, said control lever being pivotable between a first position engageable by said cam lever and a second position disengaged from said cam lever whereby said pin is rotatable between its respective disengaged and engaged positions in response to actuation of said control lever.

3. The subject matter of claim 2, including spring means mounted on said gear and coupled to said cam lever for urging said pin to rotate from said disengaged position to said engaged position in response to movement of said control lever to said second position.

4. The subject matter of claim 2, including a stop member mounted on said gear and engageable by said cam lever in response to movement of said control lever to said first position engaging said cam lever for maintaining said pin in its position disengaged from said annular portion of said hub means; and a spring mounted on said gear and coupled to said cam lever for urging said pin to rotate from its disengaged position to its engaged position in response to movement of said control lever to said second position.

5. The subject matter of claim 2, in which said recess extends chordally of said pin and has an axial extent greater than the thickness of said annular peripheral portion of said hub means, thereby permitting said annular peripheral portion to rotate freely through said recess when said pin is disposed in its disengaged position.

6. In a manure spreader having a body and a transverse axle on the body, wheels mounted on the axle for mobilely supporting the spreader body, an unloading mechanism for unloading the contents of the spreader body, and means for selectively driving the unloading mechanism, wherein the improvement comprises: a hub mounted on the axle for mounting a wheel thereon, said hub including an annular flange having a plurality of circumferentially spaced notches defined on its periphery; a sprocket gear rotatably mounted on said hub in proximity to the spreader body, said unloading mechanism including an endless drive chain journaled on the spreader body in continuous driving engagement with said sprocket gear; a pin journaled through said gear and extending axially over said annular flange of said hub, said pin having a recess defined therein extending transversely thereof receiving said periphery of said annular flange; a cam lever mounted on said pin for rotating said pin between a disengaged position wherein said annular flange of said hub clears said recess and an engaged position wherein said pin peripherally engages one of said notches for selectively drivingly coupling said gear with said hub; and means for moving said pin between said disengaged and engaged positions including a control lever pivotally mounted on said spreader body proximate to said gear, said control lever being pivotable between a first position engageable by said cam lever and a second position disengaged from said cam lever for permitting said pin to rotate between its disengaged and engaged positions respectively.

7. The subject matter of claim 6, including spring means interconnecting said cam lever with said gear for urging said pin to rotate from said disengaged position to said engaged position in response to movement of said control lever to said second position.

8. The subject matter of claim 6, including a stop member mounted on said gear and engageable by said cam lever in response to movement of said control lever to said first position engaging said cam lever, whereby said pin is maintained in said disengaged position.

9. The subject matter of claim 6, wherein said control lever includes a roller engageable with said cam lever facilitating relative movement therebetween as said control lever is moved into and out of engagement with said cam lever.

10. The subject matter of claim 6, in which said recess extends chordally of said pin and has an axial extent greater than the thickness of said annular flange of said hub, thereby permitting said annular flange to rotate freely through said recess when said pin is disposed in its disengaged position.

References Cited

UNITED STATES PATENTS

| | | | |
|---|---|---|---|
| 907,932 | 12/1908 | Wilson et al. | 239—685 |
| 1,018,984 | 2/1912 | Parcels | 239—685 |
| 2,969,986 | 1/1961 | Dyke | 239—685 |

EVERETT W. KIRBY, *Primary Examiner.*